United States Patent [19]
White

[11] 3,913,641
[45] Oct. 21, 1975

[54] TREE CLIPPER

[76] Inventor: Idas B. White, 602 S. Main St., Blountstown, Fla. 32424

[22] Filed: Feb. 11, 1974

[21] Appl. No.: 441,313

[52] U.S. Cl.......... 144/34 E; 144/3 D; 214/147 AS; 214/701 P; 214/711
[51] Int. Cl.²...................................... A01G 23/08
[58] Field of Search.......... 214/147 R, 147 AS, 660, 214/701 P, 711; 144/34 R, 34 A, 34 B, 34 E, 3 D, 2 Z, 309 AC

[56] References Cited
UNITED STATES PATENTS

| | | | |
|---|---|---|---|
| 2,682,347 | 6/1954 | Jackson | 214/147 R |
| 2,751,943 | 6/1956 | Ford | 144/34 E |
| 2,955,631 | 10/1960 | Hoadley | 144/34 E |
| 3,183,953 | 5/1965 | MacMillan et al. | 144/34 E |
| 3,327,745 | 6/1967 | Meece et al. | 144/34 E |
| 3,528,468 | 9/1970 | Blonsky | 144/34 R |
| 3,550,655 | 12/1970 | Murphy | 144/34 E |
| 3,734,327 | 5/1973 | Ellis, Jr. | 214/701 P |

FOREIGN PATENTS OR APPLICATIONS

| | | | |
|---|---|---|---|
| 885,805 | 11/1971 | Canada | 144/34 E |

*Primary Examiner*—Donald R. Schran
*Assistant Examiner*—W. D. Bray
*Attorney, Agent, or Firm*—Clarence A. O'Brien; Harvey B. Jacobson

[57] ABSTRACT

A device for cutting trees that is tractor attached and hydraulically operated and includes mounting structure for attachment to a tractor, a carriage on the mounting structure capable of vertical movement and a blade assembly mounted on the carriage for swinging movement from a generally horizontal, lowered operating position to a substantially vertical elevated folded condition. The blade assembly includes a forwardly extending stationary anvil and a horizontally reciprocal and forwardly extending blade movable toward and away from the anvil for cutting a tree positioned between the blade and anvil with the unique structural and operational features of the device enabling operation thereof by employing only two hydraulically operated piston and cylinder assemblies.

21 Claims, 11 Drawing Figures

TREE CLIPPER

BACKGROUND OF THE INVENTION

1. Field of the Invention

The present invention generally relates to an apparatus for clipping or cutting trees closely adjacent the earth line and incorporating a stationary anvil and a reciprocating blade in opposed relation thereto with the blade and anvil being supported and guided at one end thereof with the other end being open to enable reception of a tree therebetween.

2. Description of the Prior Art

In recent years, in view of the cost and lack of availability of personnel to manually cut trees for use in the logging and pulpwood industry, efforts have been made to mechanize the operation. Even with the use of power chain saws, a conventional tree felling operation requires considerable labor and expertise in efficiently cutting a tract of timber even though the trees may be arranged in a row similar to other crop plants which is currently the common practice in many areas in which new seedlings are planted shortly after harvesting a mature crop of trees.

Efforts to mechanize the tree felling operation have involved the use of large shear devices incorporating two pivotal blades moving towards each other or a single pivotal blade moving toward a stationary blade or anvil. Exemplary tree shearing devices of this type may be found in my prior U.S. Pat. No. 3,382,899 for Shearing Machine, issued May 14, 1968. In my prior U.S. Pat. No. 3,450,006 for Cylinder and Piston Assembly With Automatic Power Release, issued June 17, 1969, there is disclosed a further improvement in this type of shear in which the hydraulic fluid pressure for operating the shear blade is automatically released. Prior U.S. Pat. No. 3,327,745, for Tree Cutting Device, issued June 27, 1967 also illustrates a shear type tree cutting device and the prior art cited in these patents disclose other developments in this type of tree shearing apparatus. Another type of the device has also been developed which includes the use of a reciprocal blade or blades rather than pivoting blades which has at least one advantage over the pivoting blades inasmuch as the reciprocating blade arrangement provides an abutment engaging the tree on the opposite side thereof in relation to the blade in order to prevent the shearing action moving the tractor away from the tree which occurs due to the wedging action of the pivotal type shear blade when it is hinged toward a stationary blade or anvil. Prior U.S. Pat. Nos. 3,493,020 for Shear Type Tree Cutting Device, issued Feb. 3, 1970, U.S. Pat. No. 3,542,100 for Shear Type Tree Cutting Device with Jaw Lock, issued Nov. 24, 1970 and U.S. Pat. No. 3,572,411 for Tree Harvester, issued Mar. 23, 1971 are exemplary of this type of tree shearing device in which a reciprocating blade is used. Each of these devices employ a retractable and extendable abutment which is retracted to enable the device to straddle a tree and then extended to engage the tree on the side thereof opposite to the point of engagement of the blade with the tree which results in a somewhat complex and heavy structure in view of the movable components and the hydraulically operated piston and cylinder assemblies to operate these components.

While such previously known devices have operated with some success, they are relatively complex by virtue of several moving components which must be controlled by several piston and cylinder assemblies with such devices particularly employing at least four hydraulically operated piston and cylinder assemblies each of which adds materially to the weight and cost of the device and each of which requires separate control valves, tubing and the like.

SUMMARY OF THE INVENTION

An object of the present invention is to provide a tree clipper incorporating a horizontally reciprocating blade which projects forwardly from a track frame supported horizontally from a tractor or other vehicle with the track frame having a stationary forwardly projecting anvil thereon with the forward ends of the blade and the anvil being free and unobstructed so that the tractor or vehicle may be driven forwardly in a normal manner for positioning a tree between the anvil and blade with the blade then being moved towards the anvil by the operator of the vehicle actuating a hydraulically operated piston and cylinder assembly thus necessitating only a single reciprocal movement of the blade when cutting a tree and eliminating the necessity of positioning an abutment or anvil in a retracted position when engaging a tree and then extending the abutment into opposed relation to the blade.

Another object of the invention is to provide a tree clipper in which the reciprocating blade is operated by a single hydraulically operated piston and cylinder assembly and the tree clipper is also moved between a folded, elevated inoperative position and a downwardly extended and substantially horizontal operative position by a single hydraulically operated piston and cylinder assembly which has multiple functions thereby materially reducing the number of components employed, reducing the number of control valves operated by the tractor operator and reducing the weight and complexity of the device to maintain the initial cost as low as possible and also maintain the maintenance of the device at a minimum.

A further object of the invention is to provide a tree clipper in which the reciprocal blade is provided with roller assemblies mounting the blade for movement in a track frame with the roller assembly remote from the sharp edge of the blade being connected to the blade through an eccentric mounting pin to enable the sharp edge of the blade to be accurately positioned in parallelism to the anvil.

Still another object of the invention is to provide a tree clipper in which the hydraulically operated piston and cylinder assembly for reciprocating the blade is provided with an eccentric mounting at the end thereof remote from the blade to enable the piston and cylinder assembly to be adjusted in relation to the anvil so that the final position of the blade when the power release is activated may be accurately controlled to assure that the blade will move completely through a tree and into contact with the anvil thus eliminating any possibility of the tree not being completely severed.

Yet another object of the invention is to provide a tree clipper incorporating a mounting bracket assembly which may be attached to various types of existing tractors, skidders or other vehicles without modification thereof and which includes a substantially vertically disposed guide assembly in the form of parallel guide rails on which is mounted a vertically reciprocal carriage that is limited as to its upward and downward movement. The track frame having the anvil and reciprocal blade mounted thereon is pivotally mounted at the lower end of the carriage and a single hydraulically operated piston and cylinder assembly interconnects the blade assembly and the mounting structure on the tractor to function for the purpose of raising the tree clipper to a folded, stored position, extending the tree clipper to a lowered and horizontal position at the earth line, locking the tree clipper in its horizontal, operative position and folding the blade assembly upwardly to its folded position when elevated due to the particular connection between the blade assembly and carriage and the piston and cylinder assembly and the blade assembly.

Yet another important feature of the invention is to provide a tree clipper in accordance with the preceding objects in which the reciprocating blade is received in a guard projecting forwardly from the track frame which functions to protect the blade when retracted, protect the actuating piston rod for the blade when the blade is extended and provide an abutment surface to engage a tree in the event the blade has to be retracted from the tree prior to the cutting operation being completed or if the blade for some reason becomes stuck or wedged in the tree.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Referring now specifically to the drawings, the tree clipper of the present invention is generally designated by reference numeral 12 and is mounted on the forward end of a tractor, skidder or other vehicle which is generally designated by numeral 14. The tractor 14 is conventional in construction and includes the usual forward wheels 16 which may be rubber tired and steerable or the device may be just as effectively employed on an endless track type vehicle or a rubber tired vehicle in which the rear wheels are steered. Also illustrated for purposes of orienting the components of the present invention is the usually provided radiator structure 18 and the main frame components 20 of the tractor which are horizontally disposed and which are utilized for mounting the tree clipper to the tractor. Also, the tractor is provided with control valves at the operator's position and a hydraulic fluid pump driven from the engine of the vehicle in a well known manner with all of these components being conventional and well known.

The tree clipper 12 includes three basic assemblies, namely, a blade assembly generally designated by numeral 22, a carriage generally designated by numeral 24 and a mounting and guide structure generally designated by numeral 26.

The mounting and guide structure 26 includes horizontally elongated side plates 28 extending alongside of and against the main frame members 20 and secured thereto by suitable bolt fasteners 30 or the like. The forward ends of the plates 28 are downwardly inclined as at 32 and the upper edges of the plates are provided with upward extensions 34 at their forward ends all of which are welded or otherwise secured fixedly together. At the extreme forward edges of the plates 28, there is provided a vertically elongated guide bar 36, the configuration thereof being best illustrated in FIG. 2. The guide bars 36 are parallel to each other and are vertically oriented and rigidly secured to the plates 28 thus being rigid with the tractor 14. These guide bars 36 serve to guide the carriage 24 during its vertical movement in a manner described hereinafter.

The upper ends of the plate extensions 34 are rigidly interconnected by a horizontal plate 38 that is reinforced by gussets 40 and the top of the plate 38 is provided with upwardly extending and forwardly extending mounting lugs 42 which may also be reinforced by gussets 44 for mounting a hydraulically operated piston and cylinder assembly generally designated by numeral 46 in a manner described hereinafter. The lower end of the plates 28 adjacent the guide bars are interconnected by a transverse member 48 which is in the form of a stop member rigidly affixed to the opposed plates by welding or the like to limit the downward movement of the carriage 24 on the guide bars 36 in a manner described hereinafter and a hydraulic fluid reservoir 50 may be incorporated into the space forwardly of the tractor frame and between the plates 28 to provide an adequate reservoir for the hydraulic fluid for actuating and controlling the tree clipper. Thus, the mounting and guide structure 26 is a preformed, self-contained unit that may be installed on the tractor 14 in a short time with the plates 28 being adapted in shape and size to conform with and be rigidly secured to various types of tractors, skidders or other vehicles.

Figure 1:
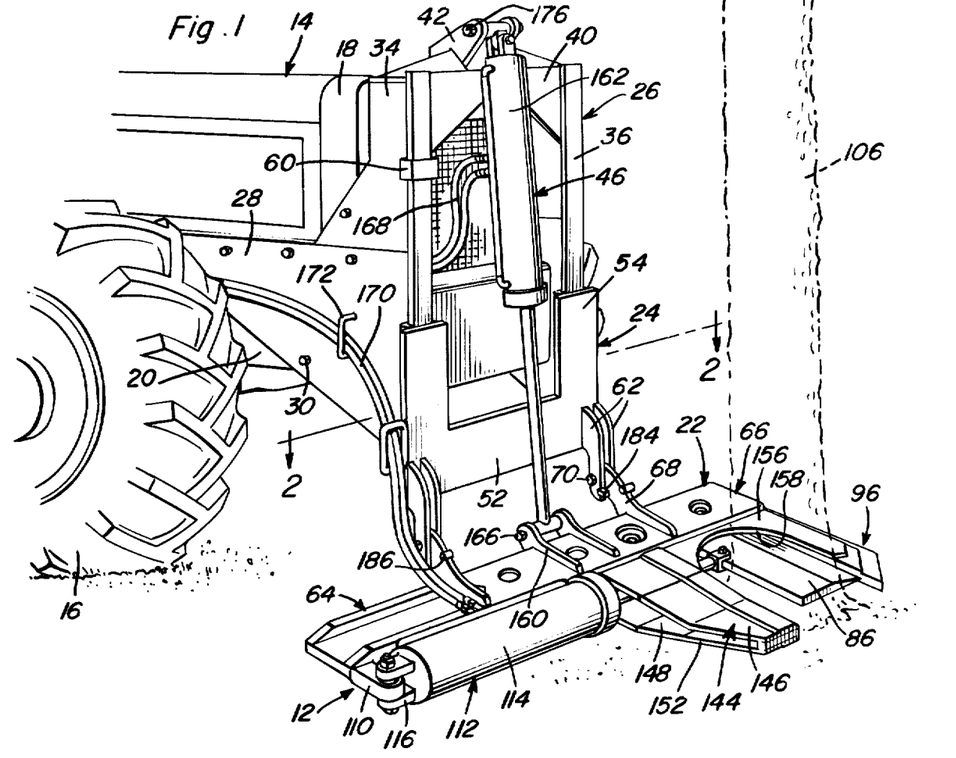
FIG. 1 is a perspective view of the tree clipper in its operative position.
Figure 2:
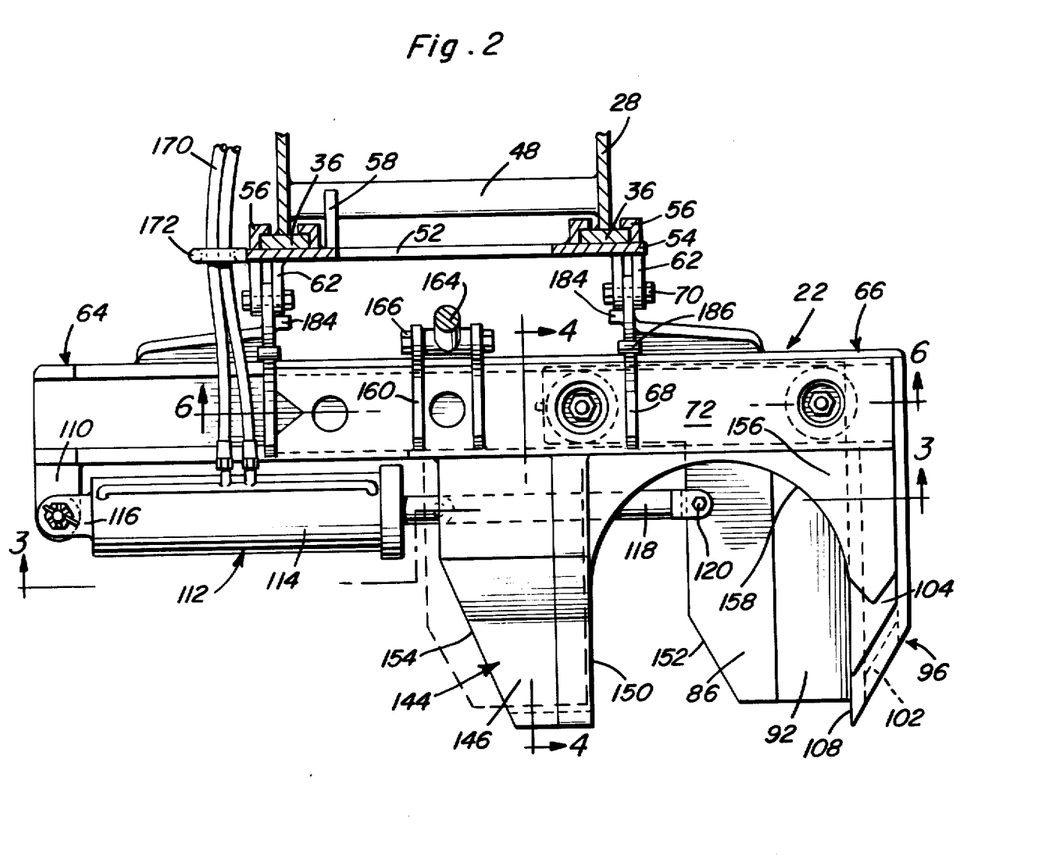
FIG. 2 is a plan, sectional view taken substantially upon a plane passing along section line 2—2 of FIG. 1 illustrating the specific structure of the guide tracks and carriage together with the association of the blade assembly therewith.
Figure 9:
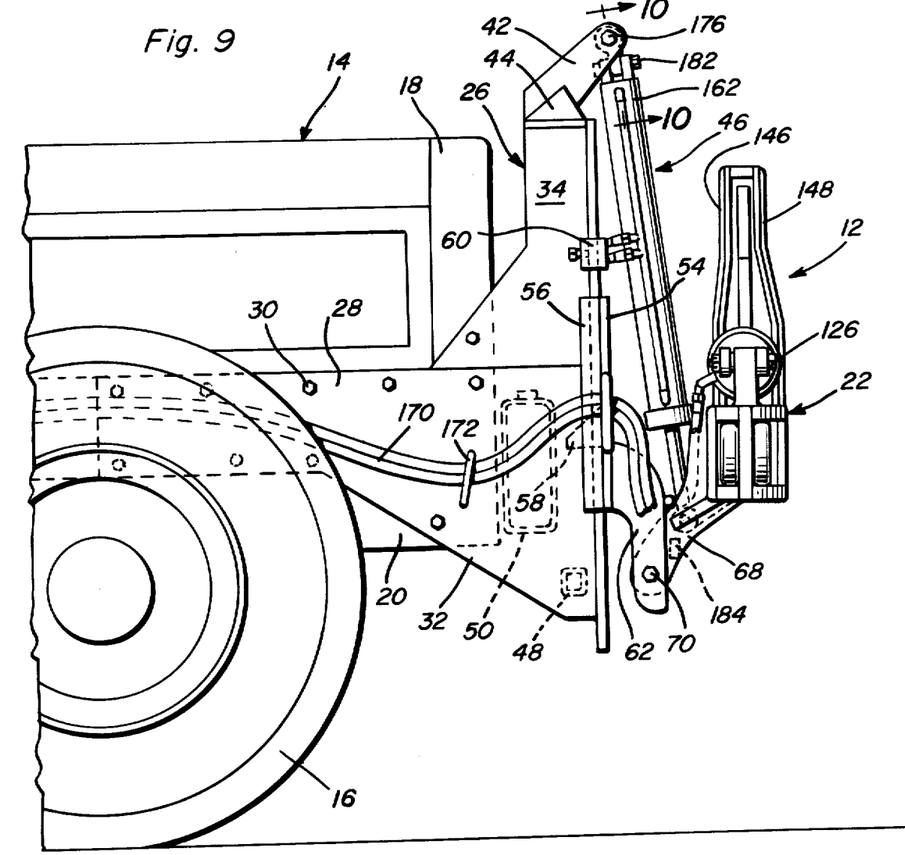
FIG. 9 is a side elevational view of the tree clipper when in its retracted and stored position.

The carriage 24 includes a generally vertically disposed plate 52 of U-shaped configuration as observed in FIG. 1 with two vertically and upwardly extending legs 54 oriented immediately forwardly of the guide bars 36 as illustrated in FIG. 2 with the inner surface of the legs 54 engaging the outer surface of the guide bars 36. The rear surface of each leg 54 of the plate 52 is provided with an L-shaped lug or lugs 56 oriented vertically thereon with the lugs 56 serving to guidingly engage the opposite edges of the guide bars 36 in the manner illustrated in FIG. 2 for guiding the carriage 24 vertically on the guide bars 36. The rear face of the plate 52 is provided with a projecting lug 58 which extends into overlying relation to the stop bar 48 that extends between the lower ends of the plates 28 thus limiting the downward movement of the carriage 24 to a predetermined extent which is the operative position of the tree clipper as illustrated in FIG. 1. The guide bars 36 may each be provided with a stop collar 60 secured in position by a suitable setscrew or setscrews or the like with the stop collar being so adjusted that it will limit the upward movement of the carriage to a position that the piston and cylinder assembly 46 has been fully retracted which will orient the carriage and blade assembly in its uppermost or inoperable position with the blade assembly 22 oriented in substantially a vertical folded condition as illustrated in FIG. 9. The stop collars 60 may be provided on either of the guide bars 36 or preferably on both guide bars to reduce stresses. Also, while the guide bars have been shown in the form of rectangular members, other shapes may be employed for the guide bars and the vertically spaced guide lugs 56 on the plate 52 corresponding in shape to the guide bars.

The forward surface of the plate 52 is provided with two pairs of forwardly and downwardly extending spaced brackets 62. Each pair of brackets 62 is located at the bottom corner of the plate 52 and project forwardly and curve downwardly as illustrated in FIGS. 1 and 9 and provide a support for connection with the blade assembly 22.

The blade assembly 22 includes a transversely extending rigid frame member generally designated by numeral 64 and which is in the form of a track frame 66 over a substantial portion of its length. Attached to the frame 64 and the track frame 66 which are integral with each other and form a rigid transverse member is a pair of upwardly and rearwardly extending brackets 68 in the form of lugs which extend between the lower ends of the spaced bracket plates 62 and are swingably connected thereto by pivot bolts 70 thus enabling the blade assembly to swing in a vertical plane about a transverse axis defined by the pivot bolts 70 which are in alignment with each other from a generally horizontal operative position as illustrated in FIG. 1 to a substantially vertical inoperative position as illustrated in FIG. 9.

Figures 4, 5, 6:
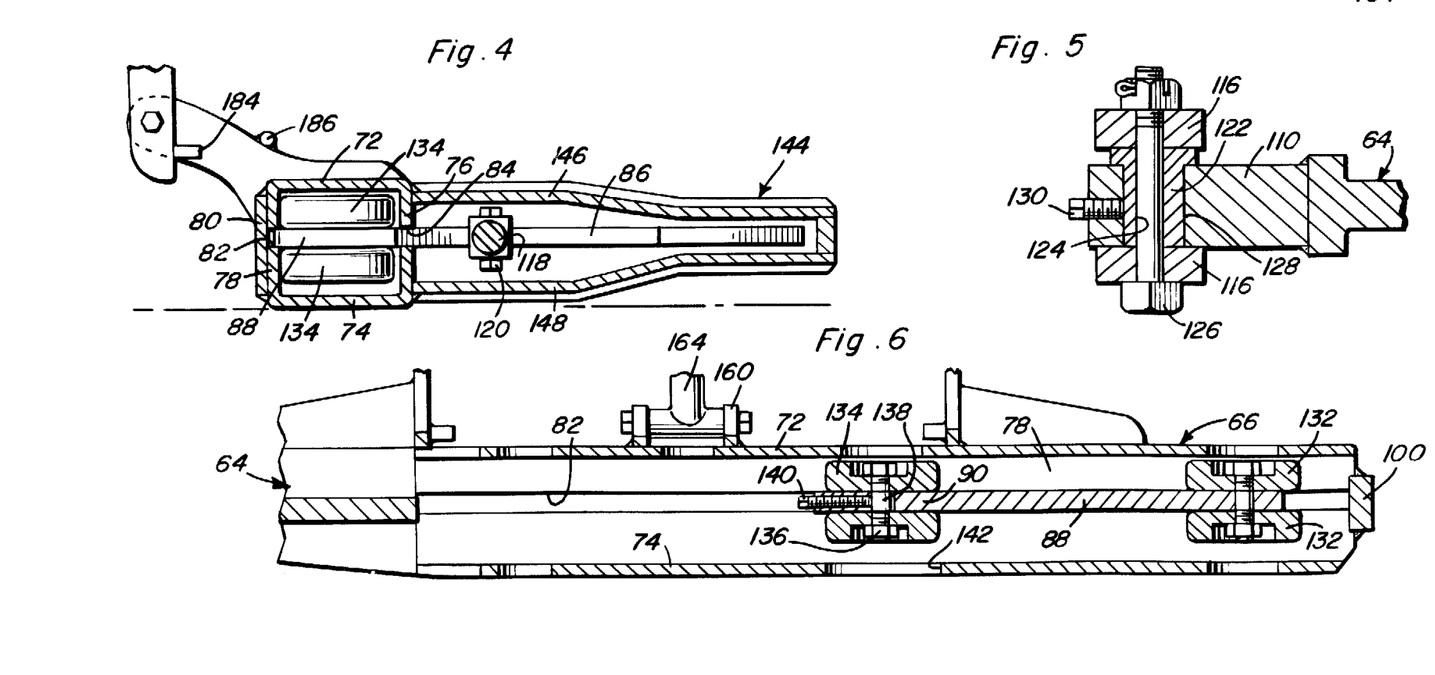
FIG. 4 is a vertical sectional view taken substantially upon a plane passing along section line 4—4 of FIG. 2 illustrating further structural details of the blade guard and the track frame.
FIG. 5 is a detailed sectional view taken substantially upon a plane passing along section line 5—5 of FIG. 3 illustrating the eccentric bushing mounting for the blade operating piston and cylinder assembly to enable adjustment of the sharp edge of the blade accurately in relation to the anvil when in its final position.
FIG. 6 is a vertical sectional view taken substantially upon a plane passing along section line 6—6 of FIG. 2 illustrating the roller structure for mounting the blade in the track frame including the eccentric mounting of the roller shaft at the end of the blade remote from the anvil to enable accurate angular positioning of the blade so that it is parallel to the anvil.
Figure 7:
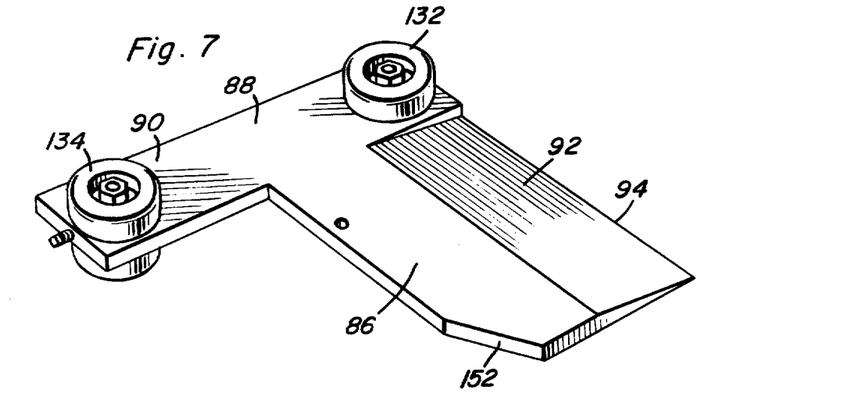
FIG. 7 is a perspective view of the blade.

As illustrated in FIG. 4, the track frame 66 is provided with upper and lower channel-shaped members 72 and 74 having facing, opposed and spaced flanges 76 at the forward edge and similar flanges 78 at the rear edge. The rear flanges 78 on the channels 72 and 74 are rigidly interconnected by longitudinally spaced lugs 80 thus providing an uninterrupted slot 82. The flanges 76 being spaced from each other provide a forward uninterrupted slot 84 with the slots 82 and 84 receiving the rear end portion of a blade 86. As illustrated in FIG. 7, the rear end portion of the blade 86 is designated by the numeral 88 and includes an extension 90 on one end thereof which is remote from the beveled portion 92 which terminates in a sharp edge 94. The blade 86 extends through the slot 84 and is guided thereby and the rear edge of the rearward portion 88 of the blade including the extension 90 thereon is slidably received and guided in the slot 82 as illustrated in FIG. 4 thereby effectively stabilizing the blade during its reciprocal movement longitudinally of the track frame 66.

Figure 3:
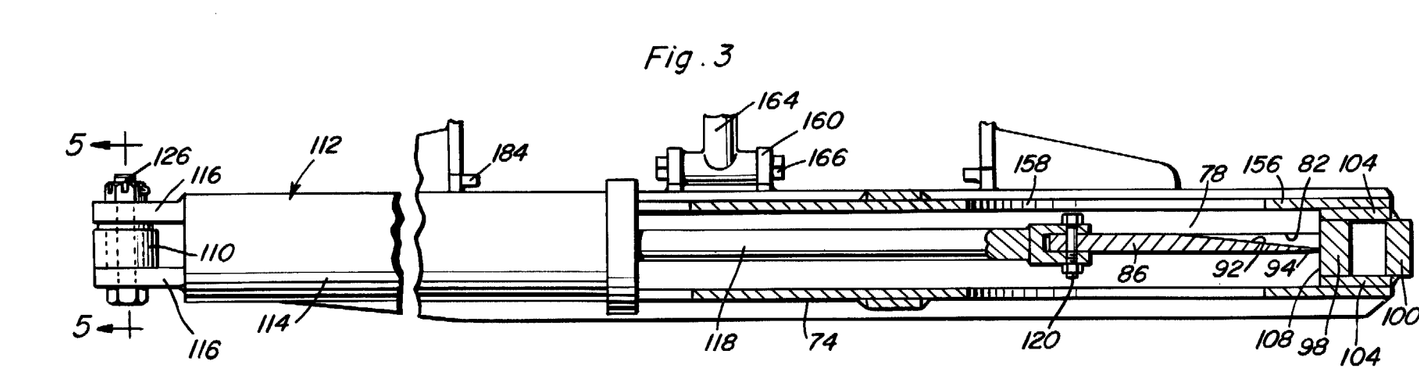
FIG. 3 is a longitudinal, sectional view taken substantially upon a plane passing along section line 3—3 of FIG. 2 illustrating the association of the reciprocating blade, the guard therefor and the anvil.

At the end of the track frame 66 adjacent the sharp edge 94 of the blade 86, there is provided a forwardly extending anvil 96 that is perpendicular to the track frame 66 and rigidly affixed thereto as by welding or the like. The anvil 96 is preferably a built-up member including an inner member 98 facing the sharp edge of the blade 94 as illustrated in FIG. 3 which is rigidly affixed to the forward edge of the flanges 76 and an outer member 100 which is rigidly fixed to the ends of the channels 72 and 74 with the members 98 and 100 being opposed and interconnected by an inclined end member 102 and top and bottom plates 104. The inner member 98 provides a vertical anvil or abutment surface which engages one side of a tree 106 so that when the blade 86 moves toward and contacts the anvil surface designated by numeral 108, the tree 106 will be completely severed.

The inner ends of the channels 72 and 74 are rigidly fixed to the transverse frame member 64 which forms an extension thereof. At the end of the frame member 64 remote from the anvil surface 108, a forwardly projecting lug 110 is rigidly fixed and provides a supporting attachment for one end of the cylinder of a hydraulically operated piston and cylinder assembly 112 in which the cylinder 114 includes a pair of projecting lugs 116 that receive therebetween the bracket lug 110 as illustrated in FIG. 5. The piston and cylinder assembly 112 also includes a piston rod 118 extending therefrom which is attached to the rear edge of the blade 86 by a pivot bolt or pin 120 so that by extending and retracting the piston rod 118 due to the double-acting nature of the piston and cylinder 112, the blade 86 may be moved towards and away from the anvil surface 108. The piston and cylinder assembly 112 includes power release structure therein similar to that disclosed in my prior U.S. Pat. No. 3,450,006 and in order to adjust the position of the sharp edge 94 of the blade in its relation to the anvil surface 108 when the power release in the piston and cylinder assembly 112 is activated, the entire piston and cylinder assembly 112 is shifted longitudinally for accurate orientation of the blade edge. This is accomplished by providing an eccentric bushing 122 through the bracket lug 110 with the bushing having an eccentric bore 124 therethrough receiving a retaining pin or bolt 126 which extends through the lugs 116 as illustrated in FIG. 5. The bushing 122 is rotatably secured in adjusted position in a bore 128 through the bracket 110 by a setscrew 130 which may be tightened or loosened by use of a suitable wrench or other tool and may be of any suitable conventional construction. Thus, by rotating the eccentric bushing 122 and locking it in adjusted position, the piston and cylinder assembly 112 may be shifted longitudinally thereby enabling the power release mechanism in the piston and cylinder assembly to be activated at precisely the desired position of the sharp edge 94 of the blade 86 so that the blade will cut completely through the tree 106.

The movement of the blade as the piston and cylinder assembly 112 is extended and retracted is guided by pairs of rollers 132 and 134 respectively at the opposite ends of the rear portion 88 of the blade 86 as illustrated in FIG. 7. The rollers 134 are on the top and bottom of the rear portion 88 of the blade and are received in and guided by the track frame 66 as illustrated in FIGS. 4 and 6. The rollers 134 are provided with an adjustment whereby the parallelism of the blade edge 94 may be accurately adjusted in relation to the anvil face 108. This adjustment is accomplished by the mounting shaft or axle 136 for the rollers having a central eccentric area 138 where it extends through a hole in the rearward extension 90 on the blade 86. The axle 136 is rotatably secured in adjusted position by a setscrew 140 threaded into the edge of the extension 90 as illustrated in FIGS. 6 and 7. Thus, by rotating the axle 136 and locking it in adjusted position by using the setscrew 140, the position of the rollers 134 may be shifted slightly in relation to the rearward extension 90 thereby varying the angle of the blade edge 94 so thast it will be precisely set in parallel relation to the anvil surface 108.

With these two adjustments, the initial orientation of the blade when it is new may be accurately adjusted and during wear and subsequent sharpening operations of the blade, the position of the blade may be adjusted so that it will always maintain a parallelism with the anvil surface and engage the anvil surface to completely cut through the tree thereby preventing the possibility of a portion of the tree not being cut. To provide access to the adjustment mechanism for the rollers 134, openings 142 may be provided in the webs of the channels 72 and 74 with the openings in certain instances being sufficiently large to enable removal of and replacement of the rollers if desired. The particular construction of the rollers, the bearing means therefor and the lubrication therefor as well as lubrication for other movable surfaces are conventional and are not detailed here.

A blade guard generally designated by numeral 144 is rigidly affixed to the forward edge of the track frame adjacent the end of the cylinder 114 having the piston rod 118 projecting therefrom with the blade guard 144 including an upper plate 146 and a lower plate 148 rigid with the forward flanges on the track frame as illustrated in FIG. 4 with the outer ends of the plates being closer together than the inner ends but being spaced apart throughout their length as illustrated in FIG. 4 to enable the blade 86 to retract completely into the guard with the front edge of the guard designated by numeral 150 being generally parallel with the anvil surface 108 and being oriented so that the sharp edge 94 of the blade will be completely retracted into the interior of the guard, at least, into alignment with the edge 150. As illustrated, the guard protects the blade when it is retracted and protects the piston rod 118 when the blade 86 is extended as illustrated in FIG. 2. The surface 150 of the guard also provides an abutment for a tree 106 in the event the blade 86 is retracted from within a tree prior to cutting completely through the tree thus preventing the blade from becoming stuck or wedged into a tree since the piston rod 118 can always be retracted and the edge surfaces 150 of the guard 144 will engage the tree both above and below the blade 86 and form an abutment surface so that the blade can be withdrawn from the tree. Also, withdrawal of the blade 86 into the guard protects the blade when the tractor is driven forwardly so that a tree 106 will be received between the anvil surface 108 and the edges 105 of the guard 144. The forward corner of the blade 86 is inclined as at 152 which will cause any brush or other material that may partially enter between the blade 86 and the guard 144 to be pushed outwardly when the blade is retracted and the edge of the guard 144 is correspondingly inclined at 154 to eliminate sharp corner edges and facilitate maneuvering of the tree clipper without entanglement with brush or other similar material. As illustrated in FIG. 4, the bottom of the frame member 64 and the track frame 66 as well as the bottom plate 148 provides a surface for engagement with the earth line when the tree clipper is lowered and protects the blade, and piston and cylinder assembly 112 from damage due to engagement with the ground surface.

The juncture between the track frame 66 and the anvil 96 includes a top plate 156 which has a generally semi-circular edge 158 which is continuous from a point generally where the curve is tangential to the anvil surface 108 to a point where it is generally tangential to the surface 150 as illustrated in FIG. 2 with the plate 156 being generally U-shaped. Rather than a single plate, two corner gusset plates may be provided with the center of the curve 158 being generally tangential to the front surface of the track frame 66. This curved surface 158 assures proper positioning of the tree so that the surface of the tree in opposite relation to the blade during the cutting operation will engage the anvil surface at a point outwardly of the line of force exerted by the piston rod 118. This line of tangency may be approximately 12 inches from the front surface of the track frame thus determining substantially the maximum diameter of tree that can be cut, that is, approximately 24 inches although this dimension may vary. With this arrangement, the force applied by the piston 118 rod is adjacent the center of the force exerted by the blade but is located inwardly thereof in order for the piston and cylinder assembly 112 to be oriented closely adjacent the track frame for rigidity and stability. The rollers 132 are on the opposite side of the line of force exerted by the piston rod 118 a distance approximately equal to the space between the line of force exerted by the piston rod 118 and the point of tangency of the curve 158 with the anvil surface 108 thereby tending to equalize the forces exerted by the piston rod 118 and eliminate excessive loads occurring on the rollers 132 which maintain the blade 86 in parallel relation to the anvil surface 108. Any tendency of the blade to angulate in relation to the anvil surface 108 when a tree is being cut is prevented by the rollers 132 engaged with the inner surface of the flanges 76 on the channels 72 and 74 and by the rollers 134 engaging the inner surfaces of the flanges 78 on the channels 72 and 74 with this point of contact being adjustable as set forth previously to precisely retain the blade edge 94 parallel with the anvil surface 108.

Figure 10:
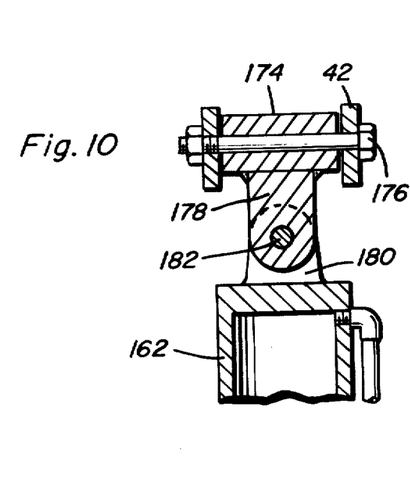
FIG. 10 is a detailed sectional view illustrating the universal connection between the upper end of the piston and cylinder assembly and the mounting structure.

The piston and cylinder assembly 46 extends between the anchor brackets 42 and the blade assembly and is connected to the blade assembly by upwardly and rearwardly extending bracket plates 160 rigid with the track frame 66 and centrally disposed between the brackets 62. The piston and cylinder assembly 46 includes a cylinder 162 and a piston rod 164 extending therefrom with the piston rod 164 being connected between the bracket plates by a pivot bolt or pin 166. The piston and cylinder assembly 46 is double acting and connected with the hydraulic system of the tractor through control valves, piping, tubing and the like with the tubing to this piston and cylinder assembly being designated by reference numeral 168 and the tubing to the piston and cylinder assembly 112 being designated by numeral 170. The U-shaped configuration of the plate 52 enables the tubing 168 to extend alongside of the inner surfaces of the bracket mounting structure while the tubing 170 extends through rod type guides 172 of loop shaped configuration or the like to the control valve assembly in the tractor operator's compartment. The upper end of the cylinder 162 includes a universal connection with the bracket lugs 42 as illustrated in FIG. 10 by the use of a sleeve 174 pivoted between the lugs 42 by a pivot bolt 176 with the sleeve 174 including a projecting lug 178 which is received between lugs 180 on the end of the cylinder 162 and pivoted thereto by a pivot bolt 182 which is perpendicular with respect to the pivot bolt 176 thereby enabling some degree of lateral flexible movement of the piston and cylinder assembly 46 to enable some degree of lateral flexing of the tree clipper without damaging the piston and cylinder assembly.

Figure 8:
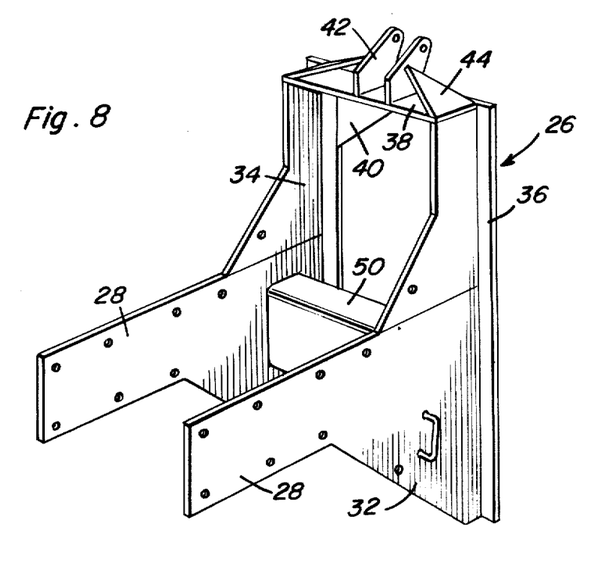
FIG. 8 is a perspective view of the mounting structure for the tree clipper.

The components of the invention receiving stress are constructed of a high tensile strength steel to maintain the weight of the device relatively low and at the same time maintain adequate strength for cutting trees. The device is movable between the operative position and the folded inoperative position by the piston and cylinder assembly 46 with the lower front edge portions of the brackets 62 which are below the pivot bolt 70 being engaged by a stop lug 184 on the bracket plate 68 thus limiting the downward movement of the blade assembly to a horizontal position. When the blade assembly is folded upwardly to its vertical position or inoperative position, the vertical swinging movement thereof may be limited by providing stop lugs 186 on the top edge of the brackets 68 which engage the front edges of the mounting bracket plate 62 above the pivot bolt 70. The upper limit stops 186 are optional since the location of the connection between the piston and cylinder assembly 46 and the blade assembly will serve to limit the upward movement of the blade assembly but the lugs 186 will prevent the blade assembly from coming into contact with the piston and cylinder assembly 46 when in its upwardly folded position. Also, the bottom of the mounting bracket structure illustrated in FIG. 8 may be provided with an inclined skid plate to engage stumps or other obstructions in the event such are encountered when backing the tractor.

With this construction, only two piston and cylinder assemblies are employed with the piston and cylinder assembly 112 having the sole purpose of reciprocating the blade with the piston and cylinder assembly having a power release at both ends thereof. The piston and cylinder assembly 46 functions to accomplish several results. Assuming that the assembly is in the inoperative position illustrated in FIG. 9 and the piston rod 164 is extended, the carriage 24 and blade assembly 22 will be lowered and guided by the guide bars 36 with the blade assembly 22 normally assuming a horizontal position as soon as the piston rod 164 is extended. Downward limiting movement of the carriage is accomplished by the lug 58 engaging the stop member 48 and at this point, the carriage 24 becomes stationary. Further extension of the piston rod 164 will be precluded since the stop lugs 184 on the bracket plate 68 will be in contact with or brought into contact with the brackets 62 thus rigidly locking the blade assembly 22 in the horizontal position which position is at the earth line which has been determined by locating the stop member 48 and the stop lug 58 in predetermined relationship so that the bottom surfaces of the blade assembly 22 will be closely adjacent the earth line and the cut on the tree 106 will be closely adjacent the earth line. This locking feature is accomplished by the fact that the pivot axis defined by the bolt 166 connecting the piston and cylinder assembly 46 to the blade assembly 22 is located forwardly of the pivot bolts 70 in all positions of the blade assembly 22. With the tree clipper locked in position, the tractor operator merely has to drive the tractor forwardly or maneuver it in the necessary manner to bring the tree into registry with the space between the anvil surface 108 and the sharp edge 94 of the blade 86 which has been retracted into the guard so that the tree will be engaged by the curved edge 158. Then the blade 86 is moved toward the anvil thereby cutting the tree and causing all trees that are cut to be felled in a single direction, that is, over the anvil in view of the tapering wedge-shaped configuration of the blade thus making it more convenient to skid the trees by using a skidder and conventional choker chains or cables since all of the trees will have their stump end in generally aligned relation when the trees are in a row thus facilitating the skidding operation. When the cutting operation has been completed, the retraction of the piston and cylinder assembly 46 will pivot the blade assembly 22 upwardly and elevate the blade assembly 22 and the carriage 24 to its uppermost position until the upper ends of a leg 54 of plate 52 comes into engagement with a stop collar 60. This folding and elevation of the tree clipper enables the tractor to be more easily maneuvered in a forest and will retain the tree clipper from coming into contact with low bushes, brush and the like.

Figure 11:
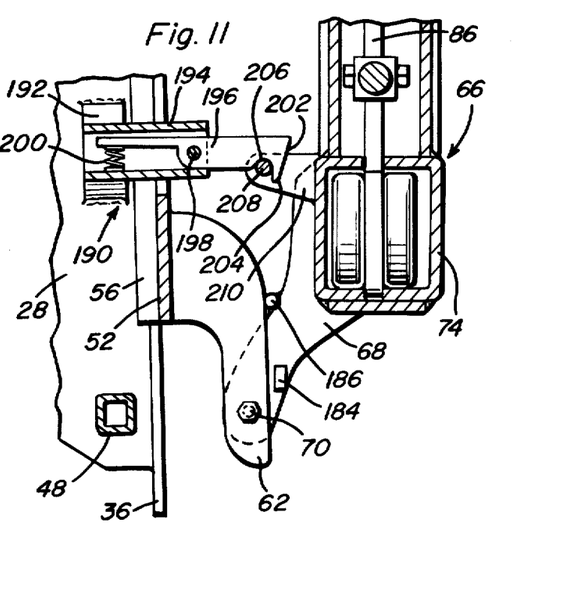
FIG. 11 is a fragmental sectional view illustrating a hook assembly for retaining the blade assembly and track frame in the vertical position of FIG. 9.

FIG. 11 illustrates a hook assembly generally designated at 190 which is optionally provided for retaining the blade assembly 22 in its generally vertical position to stabilize and support the blade assembly when not in use such as when the tractor is being driven or transported to and from the tree harvesting site. The hook assembly 190 includes an inwardly extending bracket 192 welded or otherwise rigidly affixed to a side plate 28 and having a forwardly extending tubular mounting member 194 mounted thereon. An elongated hook member 196 has its central portion pivotally supported by a pivot pin 198 disposed horizontally at the forward end of the mounting member 194. The rearward end of the hook member 196 is spring-biased upwardly by a compression coil spring 200 and the forward end thereof is provided with a downwardly and inwardly inclined cam surface 202 terminating in a depending lower end 204. The undersurface of the hook member 196 includes a rounded notch 206 at the juncture with the depending lower end 204 of the cam surface 202 thus defining a hook which is capable of automatically engaging a transverse bar or keeper 208 extending between 210 welded to the track frame 66 of the blade assembly 22 as the blade assembly is swung upwardly and raised to its vertical transport position.

When the carriage 24 and blade assembly 22 are lowered by extending the piston rod 164, the keeper 208 or clevis will move downwardly from the notch 206 and below the lower end 204 of the cam surface thereby automatically disengaging from the hook member for return of the blade assembly toward its horizontal operative position. This enables the blade assembly to be mechanically retained in its inoperative position without continuous application of force to the piston rod by the relatively long lever arm formed by the weight of the blade assembly tending to pivot downwardly about the pivot axis defined by the pivot bolts especially when the tractor is being driven or hauled to and from a logging site. Also, an automatic or remote manually operated latch structure may be provided for the carriage 24 to retain it in elevated position for transport if desired. The tree clipper is oriented so that the tree when engaged by the blade and anvil surface is oriented slightly to the left of the tractor to enable better observation by the operator thus enabling the operator to more effectively maneuver and control the tractor to bring the tree into the area between the anvil surface and blade. The cutting of the tree closely adjacent the earth line leaves very short stumps thereby enabling reforestation of the area by planting new seedlings and also renders the area more attractive in appearance and produces the maximum volume of wood products from each tree.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A tree clipper comprising a clipping blade, said blade being moveably mounted with respect to a fixed anvil means, fluid operated cylinder and piston means interconnecting said blade and anvil means, guide means adapted to be fixedly attached to a vehicle, a carriage reciprocally mounted with respect to said guide means, means mounting said anvil means on said carriage for movement therewith, and fluid pressure cylinder and piston means adapted to be attached to a vehicle at an upper end portion and connected to the anvil means at a lower end portion to raise and lower the carriage, anvil means and blade, lock the anvil means and blade in substantially horizontal tree cutting position at the earth line and fold the navil means and blade to a substantially vertical position when raising.

2. The structure as defined in claim 1 wherein said anvil means includes an elongated track frame adapted to extend transversely of the front of a vehicle, and a forwardly extending anvil rigid with said track frame, said blade including means at the rear edge portion thereof mounted with respect to the track frame for reciprocal guided movement toward and away from the anvil.

3. The structure as defined in claim 1 wherein said guide means includes a pair of generally parallel, substantially vertical guide members, lower stop means rigidly mounted with respect to said guide means, said carriage including a pair of generally parallel slide means reciprocally mounted on said guide members, said carriage being engageable with said stop means to limit downward movement thereof.

4. The structure as defined in claim 2 wherein said means at the rear of the blade includes a pair of rollers journaled on said blade at spaced points and rollingly engaged with the track frame to maintain the blade perpendicular to the track frame during reciprocation towards and away from the anvil.

5. The structure as defined in claim 4 wherein said fluid cylinder and piston means for moving the blade is mounted substantially parallel to and forwardly of the track frame and includes a piston rod connected to said blade forwardly of the track frame, means adjustably connecting the cylinder and piston means to the track frame remote from the anvil to enable adjustment of the blade so that it will accurately approach and contact the anvil when a power release in the end of the cylinder and piston means adjacent the blade is actuated.

6. The structure as defined in claim 4 wherein said roller on the blade remote from the anvil is adjustably mounted on the blade to adjust the edge of the blade adjacent the anvil into parallel relation to the anvil.

7. The structure as defined in claim 4 wherein the rear edge of said track frame includes an elongated slot therein slidingly and guidingly receiving the rear edge of said blade.

8. The structure as defined in claim 4 wherein said track frame includes a forwardly projecting blade guard disposed in spaced relation to the anvil, said guard including vertically spaced plates rigidly mounted with respect to each other and receiving the blade therebetween when the blade is retracted thereby protecting the piston rod when the blade is adjacent the anvil and providing an abutment for a tree when the blade becomes wedged into a tree and must be retracted into the guard for removal therefrom.

9. The structure as defined in claim 1 wherein said means mounting the anvil means to the carriage includes a pair of spaced brackets mounted for pivotal movement about a transverse axis with respect to brackets on the carriage, said brackets on the anvil means and carriage including operatively associated stop means to limit downward pivotal movement to substantially horizontal attitude.

10. The structure as defined in claim 9 wherein the lower end portion of the cylinder and piston means for raising and lowering the carriage is connected to the anvil means forwardly of the transverse axis to force the carriage downwardly until stopped by stop means on the guide means and then lock the operatively associated stop means on the brackets in operative relationship thereby locking the anvil means and blade in horizontal position at the earth line when the cylinder and piston means is extended and folding the anvil means and blade upwardly to a substantially vertical position when the cylinder and piston means is retracted.

11. The structure as defined in claim 1 wherein said guide means includes upper stop means to limit upward movement of the carriage when the cylinder and piston means is retracted.

12. The structure as defined in claim 1 together with means automatically locking said anvil means and blade in said substantially vertical position when raised by said cylinder and piston means connected to the anvil means and automatically releasing said anvil means and blade when lowered from the elevated position to enable the anvil means and blade to unfold toward substantially horizonal tree cutting position.

13. A tree clipping apparatus comprising a blade reciprocally mounted with respect to a stationary member and in generally parallel relation thereto, said blade and stationary member being mounted generally parallel to the path of movement of a vehicle and including free end portions defining an unobstructed entrance area for movement of a tree therebetween by maneuvering the vehicle in its path of movement, said blade including an inner edge portion generally perpendicular to the stationary member guidedly mounted for movement transversely of the path of movement of the vehicle, said blade and stationary member being mounted forwardly of a vehicle and oriented close to the earth line of the tree, means for moving said blade and stationary member to generally vertical and folded position in elevated relation to the earth line, means releasably locking the blade and stationary member in horizontal position adjacent the earth line of the tree, and means automatically locking said blade and stationary member in vertical position when elevated and folded and automatically releasing said blade and stationary member when lowered to enable the blade and stationary member to unfold toward horizontal position.

14. In a tree cutting device adapted to be tractor mounted and including a tree cutting blade assembly, a supporting structure for supporting the blade assembly from a tractor for positioning the blade assembly in a generally horizontal tree cutting lower position and an elevated generally vertical transport position, said supporting structure comprising a carriage supported from a tractor for guided movement in a vertical plane, means on said carriage for pivotally mounting the blade assembly therefrom for pivotal movement about a generally horizontal axis between horizontal and vertical positions, and power means connected to the blade assembly in laterally spaced relation to the horizontal axis and connected to the tractor above the carriage for swinging the blade assembly from horizontal position to vertical position when lifting force is exerted on the blade assembly and elevating the carriage and blade assembly to transport position.

15. The structure as defined in claim 14 wherein said power means includes a fluid pressure operated cylinder and piston assembly interconnecting the blade assembly and tractor outwardly of the horizontal axis and above the carriage.

16. The structure as defined in claim 14 wherein said supporting structure includes vertical guide members adapted to be mounted on a tractor, said carriage being vertically movably mounted on said guide members, said carriage includes means to limit downward movement thereof, and limit means associated with the horizontal axis to limit pivotal movement of the blade assembly in both positions to enable the blade assembly to be locked in horizontal tree cutting position by extending the cylinder and piston assembly.

17. In a tractor mounted tree cutting device having a supporting structure including a carriage movable between a lower position and an elevated position, a blade assembly, means pivotally supporting the blade assembly for pivotal movement about a horizontal axis between a horizontal tree cutting position and a vertical folded position, said blade assembly including a movable blade member, a generally horizontally disposed guide means guidingly engaging said blade member, said guide means including a frame member having means thereon to engage a tree in opposed relations to the blade member, power means interconnecting the blade member and frame member to move said blade member in relation to a tree, power means connected to said frame member in laterally spaced relation to the horizontal axis to power said blade assembly to said cutting and folded positions, and means limiting pivotal movement of the blade assembly toward cutting position whereby the power means will lock the blade assembly in cutting position.

18. The structure as defined in claim 17 wherein said blade member and tree engaging means on the frame member are substantially parallel to each other and adapted to extend forwardly of a tractor to enable a tree to be received therebetween when the blade member is retracted and the tractor maneuvered forwardly, and a guard member extending forwardly from the frame member in spaced parallel relation to the tree engaging means on the frame member and receiving said blade member when in retracted position to enable withdrawal of the blade member from a tree when the blade member is retracted.

19. The structure as defined in claim 18 wherein said power means interconnecting said blade member and frame member includes a cylinder and piston assembly paralleling said frame member and disposed forwardly of the frame member, said cylinder and piston assembly including a piston rod connected to the blade member and extending through said guard member and being protected thereby.

20. The structure as defined in claim 17 wherein said frame member includes an elongated, horizontal guide track, said blade member having spaced rollers journaled thereon in horizontal spaced relation and being received in said track, and means adjustably mounting one of said rollers on said blade member to enable adjustment of the blade member into parallel relation to the tree engaging means.

21. The structure as defined in claim 20 wherein said tree engaging means on the frame member includes an anvil, said blade member having a sharp edge defined by a tapered upper surface defining a wedge shaped member to throw all trees toward the anvil to facilitate subsequent tree handling.

\* \* \* \* \*